United States Patent
Karadi et al.

(10) Patent No.: US 9,570,976 B2
(45) Date of Patent: Feb. 14, 2017

(54) SWITCHED CAPACITOR POWER CONVERTER

(71) Applicant: NXP B.V., Eindhoven (NL)

(72) Inventors: Ravichandra Karadi, Eindhoven (NL); Gerard Villar Pique, Eindhoven (NL)

(73) Assignee: NXP B.V., Eindhoven (NL)

(*) Notice: Subject to any disclaimer, the term of this patent is extended or adjusted under 35 U.S.C. 154(b) by 295 days.

(21) Appl. No.: 14/455,756

(22) Filed: Aug. 8, 2014

(65) Prior Publication Data

US 2015/0069928 A1 Mar. 12, 2015

(30) Foreign Application Priority Data

Sep. 6, 2013 (EP) ..................................... 13183415

(51) Int. Cl.
- H05B 37/00 (2006.01)
- H02M 3/07 (2006.01)
- H05B 33/08 (2006.01)

(52) U.S. Cl.
CPC ........... H02M 3/07 (2013.01); H05B 33/0896 (2013.01)

(58) Field of Classification Search
CPC .............................. H02M 3/07; H05B 33/0815
USPC ......................................................... 315/228
See application file for complete search history.

(56) References Cited

U.S. PATENT DOCUMENTS

| | | | |
|---|---|---|---|
| 4,807,104 A | 2/1989 | Floyd et al. | |
| 2004/0264223 A1* | 12/2004 | Pihlstrom | H02M 3/07 363/89 |
| 2009/0072800 A1* | 3/2009 | Ramadass | H02M 3/07 323/271 |
| 2009/0278520 A1* | 11/2009 | Perreault | H02M 3/07 323/282 |
| 2009/0323378 A1 | 12/2009 | Melse | |
| 2010/0253154 A1 | 10/2010 | Yeates | |
| 2013/0043800 A1* | 2/2013 | Tsai | H05B 33/0815 315/201 |

(Continued)

FOREIGN PATENT DOCUMENTS

| | | |
|---|---|---|
| EP | 0 461 717 A1 | 12/1991 |
| WO | 2009/136368 A1 | 11/2009 |

OTHER PUBLICATIONS

Seeman, M.D. et al. "Analysis and Optimization of Switched-Capacitor DC-DC Converters", IEEE Trans. on Power Electronics, vol. 23, No. 2, 841-851 pgs. (Mar. 2008).

(Continued)

Primary Examiner — Don Le (57) ABSTRACT

A switched capacitor power converter comprising a set of at least two capacitors; an input for receiving an input voltage an output for outputting an output voltage different to the input voltage, a plurality of switches configured to arrange the set of capacitors into a plurality of different subcircuit arrangements between the input and output for converting the input voltage to the output voltage; wherein the set of capacitors is configured to adopt a first subcircuit arrangement in which the set is connected to the input, a second subcircuit arrangement different to the first subcircuit arrangement and a third subcircuit arrangement, different to the first and second arrangements, in which the set is connected to the output, the subcircuit arrangements configured such that each of the capacitors in the set acts as a floating capacitor.

15 Claims, 4 Drawing Sheets

(56) References Cited

U.S. PATENT DOCUMENTS

| | | | | |
|---|---|---|---|---|
| 2014/0346962 A1* | 11/2014 | Sanders | ............ | H05B 33/0815 |
| | | | | 315/193 |
| 2015/0084701 A1* | 3/2015 | Perreault | ................ | H03F 3/193 |
| | | | | 330/297 |
| 2016/0190917 A1* | 6/2016 | Delos Ayllon | ..... | H05B 33/0815 |
| | | | | 315/307 |
| 2016/0197552 A1* | 7/2016 | Giuliano | ................ | H02M 3/07 |
| | | | | 363/60 |

OTHER PUBLICATIONS

Makowski, M.S. et al. "Performance limits of switched-capacitor DC-DC converters" Proc. IEEE Power Electronics Specialists Conf., vol. 2, No. 1215-1221 pgs. (Jun. 1995).

Linear Technology Corporation "LT3494/LT3494A Micro-Power Low Noise Boost Converter with Output Disconnect", 12 pgs., retrieved from the Internet at http://www.linear.com/product/LT3494 (2006).

Extended European Search Report for EP Patent Appln. No. 13183415.2 (Feb. 19, 2014).

* cited by examiner

SWITCHED CAPACITOR POWER CONVERTER

CROSS-REFERENCE TO RELATED APPLICATIONS

This application claims the priority under 35 U.S.C. §119 of European patent application no. 13183415.2, filed on Sep. 6, 2013, the contents of which are incorporated by reference herein.

This invention relates to a switched capacitor power converter. It also relates to an integrated circuit incorporating, at least in part, a switched capacitor power converter. Further, the invention relates to a system comprising a switched capacitor power converter arranged to power an organic light emitting diode assembly. It also relates to a method of operating a switched capacitor power converter.

A switched capacitor power converter (SCPC) can be used to convert an input voltage to a different output voltage. The SCPC may be arranged as an up converter to provide an output voltage greater than the input voltage or a down converter to provide an output voltage lower than the input voltage. A SCPC comprises one or more capacitors that can be arranged in different subcircuit configurations between an input and an output using switches. In one known arrangement, a controller cyclically controls the switches between a charging phase and a discharging phase. In the charging phase, the switches are set to arrange the capacitors into a first subcircuit configuration and the capacitors are charged. In the discharging phase, the switches are controlled such that the capacitors are arranged in a second subcircuit configuration, different to the first configuration and the capacitors are discharged. It will be appreciated that other configurations are possible in which some capacitors are charged in the first phase and others in the second phase and/or the input and output may be connected to the subcircuit arrangements in one or both of the phases. Different numbers of capacitors and different subcircuit arrangements allow such SCPCs to provide a large number of different conversion ratios comprising the ratio of the output voltage to the input voltage.

Figure 1:
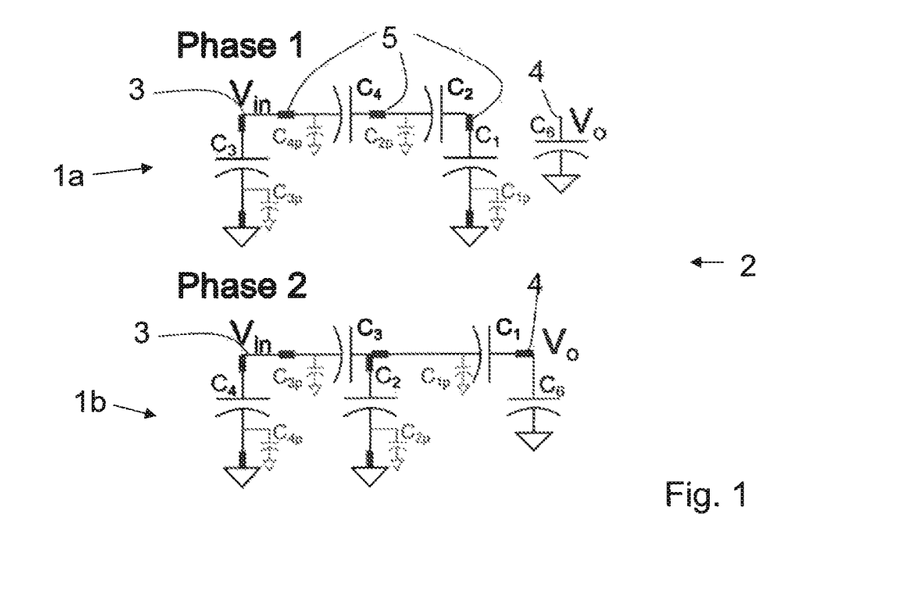
FIG. 1 shows the charging and discharging subcircuit arrangements of a known SCPC.

FIG. 1 shows subcircuit arrangements 1a and 1b comprising the charging and discharging phases of a known SCPC 2. The SCPC 2 comprises four capacitors, $C_1$, $C_2$, $C_3$ and $C_4$. The subcircuit arrangements are formed between an input 3, which receives a voltage $V_{in}$ and provides it to the arrangements 1a and 1b, and an output 4, which receives an output voltage $V_o$ from the arrangement 1b and provides it to a load. An output capacitor $C_6$, which is connected to the load, is shown as receiving the output voltage from the output 4. The SCPC 2 includes a plurality of switches 5 which are used to arrange the capacitors $C_1$, $C_2$, $C_3$ and $C_4$ into the subcircuit arrangements shown as 1a and 1b. Further, capacitors $C_{1p}$, $C_{2p}$, $C_{3p}$ and $C_{4p}$ are shown to represent the parasitic capacitance in the SCPC 2. In the charging phase 1a, the capacitors are charged to the following voltages relative to the input voltage $V_{in}$: $C_1=4V_{in}$, $C_2=2V_{in}$, $C_3=V_{in}$ and $C_4=V_{in}$. These are the voltages attained after an initial start-up cycle comprising the transition from arrangement 1a to 1b and back to 1a when the voltage $V_{in}$ is first applied. In the discharging phase, the input voltage and the voltage attained by $C_1$ and $C_3$ is applied to the output 4 thus providing an output voltage of $V_{in}+4V_{in}+V_{in}=6V_{in}$.

SCPCs are gaining wider use and becoming appealing alternatives to inductive converters. An advantage of the SCPC is that they use only switches and capacitors in contrast to inductive converters which require coils, which tend to be bigger, more expensive and difficult to integrate on silicon. Thus, SCPCs are more attractive in a number of applications, especially those that require fully integrated or miniaturized solutions. A disadvantage of SCPCs stems from the fact that the possible voltage conversion ratios are discrete and limited by the number of capacitors unlike the inductive converters where the conversion ratio is a continuous function of duty ratio of the switching signal. In general, the efficiency of a SCPC can be improved by using a higher number of capacitors. The number of capacitors and switches is less of a concern if it is completely integrated converter (both the switches and the capacitors are on chip), since in an integrated domain the number of components is less important than their size. However, the size of the required capacitor scales with the required output power precluding complete integration in some applications. With external floating capacitors, the package size as well as the number of external capacitors will become the limiting factors. The number of pins also increases with the number of external floating capacitors adding to cost and area of the solution.

According to a first aspect of the invention we provide a switched capacitor power converter comprising
    a set of at least two capacitors;
    an input for receiving an input voltage
    an output for outputting an output voltage different to the input voltage,
    a plurality of switches configured to arrange the set of capacitors into a plurality of different subcircuit arrangements between the input and output for converting the input voltage to the output voltage,
    wherein the set of capacitors is configured to adopt a first subcircuit arrangement in which the set is connected to the input, a second subcircuit arrangement different to the first subcircuit arrangement and a third subcircuit arrangement, different to the first and second arrangements, in which the set is connected to the output, the subcircuit arrangements configured such that each of the capacitors in the set acts as a floating capacitor.

We provide an advantageous dc-dc convertor arrangement that may be space efficient and power efficient when compared to a power converter operating over two subcircuit arrangements with an equivalent conversion ratio. This three "phase" arrangement, in which each of the capacitors comprises a floating capacitor, has been found to be particularly efficient and typically requires fewer components to implement than a two phase converter.

The convertor may include a controller configured to switch the switches over three phases, the phases corresponding to the three subcircuit arrangements. Thus, the controller may include timing circuitry to cycle through the three phases and control the plurality of switches such that the set of capacitors adopt the first, second and third subcircuit configurations and connect to the input and output when required. It will be appreciated that more than three phases may be provided and the converter may be configured to include a fourth, fifth, sixth or further subcircuit arrangement that may be different to the first, second and third subcircuit arrangements. Alternatively, the fourth, fifth, sixth or further subcircuit arrangements may be the same as one of the first, second or third subcircuit arrangements but adopted non-sequentially with the subcircuit arrangement it is identical to.

Each of the capacitors in the set may comprise two capacitor plates and the set may be configured such that each plate is associated with a corresponding switch. Thus, the plurality of switches may be arranged adjacent each of the plates of the capacitors. This allows each plate or "side" of each capacitor to be reconfigured as required. This arrangement allows all of the capacitors to operate as floating capacitors.

Each of the capacitors in the set may comprise two capacitor plates and wherein the controller is configured to reconfigure the connection at each of the plates in at least one of the three phases. It has been found that reconfiguring the capacitors in this way over the three phases makes for efficient use of the capacitors and therefore provides an efficient switched capacitor power converter.

Two of the subcircuit arrangements may comprise subcircuit arrangements in which the capacitors are charged and one of the subcircuit arrangements may comprise an arrangement in which the output voltage is adapted to be presented to the output. Providing two charging phases and one output phase allows for efficient use of the capacitors to achieve a desired conversion ratio. The SCPC may operate as an up converter or a down converter.

The set may comprise at least three capacitors. The subcircuit arrangements may be configured such that only one of a net of three capacitors is charged to a voltage greater than the input voltage. This allows use of capacitors with lower blocking voltage having smaller size or higher capacitance for the same size.

The set may comprise three capacitors and the subcircuit arrangements may be configured such to provide a 6/1 conversion ratio. A 6/1 conversion ratio is advantageous for powering OLED systems from a battery voltage source.

At least one of the capacitors in the set may be connected to the input in each of the first, second and third subcircuit arrangements. The subcircuit arrangements may be arranged such that the output voltage is provided to the output only in the third subcircuit arrangement.

Optionally, the set comprises three capacitors, a first, second and third capacitor, and,
   the first subcircuit arrangement comprises a first charging arrangement in which the first and second capacitors are arranged in a parallel arrangement and said parallel arrangement is connected to the input;
   the second subcircuit arrangement comprises a second charging arrangement in which the first and second capacitors are arranged in series along with the input and are configured to charge the third capacitor; and
   the third subcircuit arrangement comprises an output arrangement in which all three capacitors are arranged in series with the voltage source and the output.

According to a second aspect of the invention we provide a method of converting an input voltage to an output voltage in a switched capacitor power converter having a set of at least two capacitors, comprising the steps of;
   arranging the capacitors into a first subcircuit arrangement in which the set is connected to an input for receiving the input voltage,
   arranging the capacitors into a second subcircuit arrangement different to the first subcircuit arrangement; and
   arranging the capacitors into a third subcircuit arrangement, different to the first and second arrangements, in which the set is connected to an output for outputting the converted output voltage, the subcircuit arrangements configured such that each of the capacitors in the set acts as a floating capacitor.

The method may include the step of cyclically switching through the first, second and third subcircuit arrangements.

According to a third aspect of the invention we provide an integrated circuit (IC) including the switched capacitor power convertor as defined in the first aspect.

According to a fourth aspect of the invention we provide a system including the integrated circuit of the third aspect or the switched capacitor power convertor of the first aspect and at least one Organic Light Emitting Diode (OLED) wherein the output of the switched capacitor power convertor is configured to power said OLED.

The input may be configured to receive an input voltage from a battery, such as a lithium-ion battery. The power converter of the system has particular application in powering an OLED or OLED assembly from a battery voltage source.

There now follows, by way of example only, a detailed description of embodiments of the invention with reference to the following figures, in which.

Figure 2:
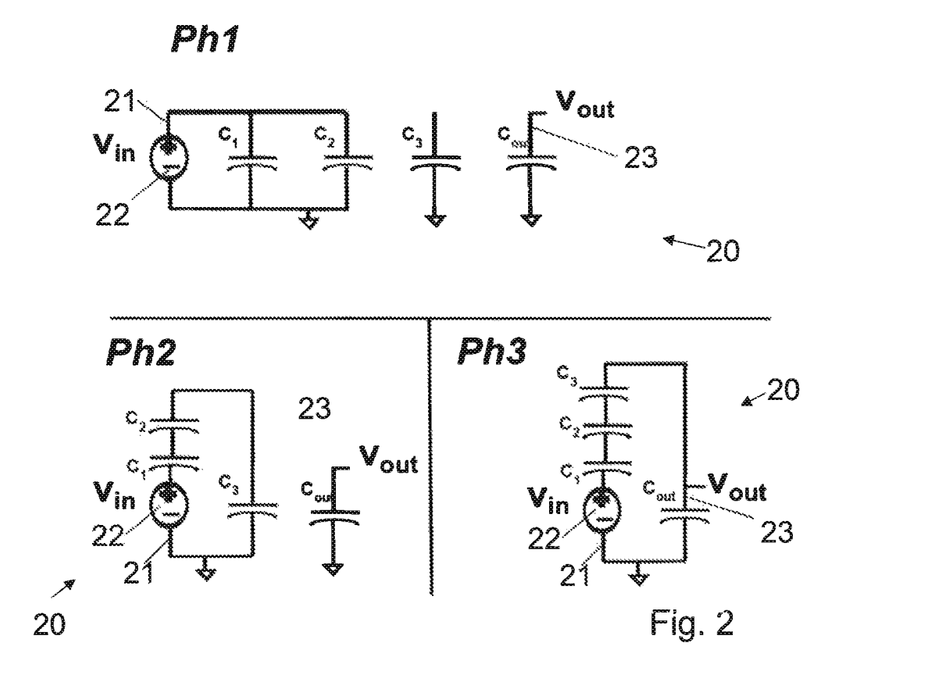
FIG. 2 shows three subcircuit arrangements of an example SCPC with a conversion ratio of 6/1 operating as an up converter.

An example SCPC 20 is shown in FIG. 2 which is configured to operate over three phases, each phase comprising a different subcircuit arrangement of a set of three capacitors, $C_1$, $C_2$ and $C_3$. The three phases and corresponding subcircuit arrangements are shown as Ph1, Ph2 and Ph3 in FIG. 2. The SCPC 20 includes an input 21, which is shown connected to a voltage source 22 from which it receives an input voltage, $V_{in}$. The SCPC 20 also includes an output 23, which is connected to an output capacitor $C_{out}$ and supplies an output voltage $V_{out}$ thereto. The output capacitor $C_{out}$ forms part of a load (not shown) that is powered by the SCPC 20. The SCPC 20 is shown acting as an up convertor. The subcircuit arrangements of SCPC 20 shown in FIG. 2 are configured to give the SCPC 20 a conversion ratio of 6/1, which comprises the ratio $V_{out}/V_{in}$.

The SCPC 20 includes a plurality of switches (not shown) that are controlled such that the capacitors $C_1$, $C_2$ and $C_3$ are connected together, and the set is connected to the input 21 and output 23, to form the subcircuit arrangements of phase one, Ph1, phase two, Ph2, and phase three, Ph3. The switches may comprise MOSFETs that each receive a control signal from a controller (not shown). The controller may form part of the SCPC 20 or it may be external thereto. The controller is configured to control the switches such that the subcircuit arrangements are formed. In this embodiment, the controller is configured to cycle through the three phases in turn. Thus, the controller is adapted to configure the switches such that the SCPC 20 adopts the subcircuit configuration shown as phase one, Ph1, followed by the subcircuit configuration shown as phase two, Ph2, followed by the subcircuit configuration shown as phase three, Ph3. The controller then repeats this sequence, returning to the subcircuit configuration shown as phase one, Ph1, and so on.

In this embodiment, in all of the three phases the input 21 is connected to the voltage source 22. Thus, the voltage $V_{in}$ is applied to the set of capacitors in each of the subcircuit configurations, albeit to different capacitors in the set or different groups of capacitors in the set. In this embodiment, in the third phase, Ph3, the set of capacitors is connected to the load via the output 23. In particular, the SCPC 20 is connected to the load only in the third phase. Thus, the first and second phases can be considered to be two separate charging phases that have different subcircuit arrangements and the third phase can be considered to be an output or discharging phase having a further, different subcircuit arrangement. The provision of three phases is advantageous as a power efficient and space efficient topology can be created. The SCPC 20 of the invention requires less capacitors in the set to achieve a given conversion ratio when compared to a two-phase SCPC, such as that shown in FIG. 1.

Phase 1, Ph1 comprises a first subcircuit arrangement in which a subset of the set of capacitors, comprising capacitors $C_1$ and $C_2$, are connected to the voltage source 22 in a parallel arrangement. In use, capacitors $C_1$ and $C_2$ are thus both charged to $V_{in}$. Capacitor $C_3$ is not connected to the voltage source 22, nor capacitors $C_1$ and $C_2$, nor the load. The output 23 is connected to the load but not to the remainder of the subcircuit arrangement.

Phase 2, Ph2, comprises a second subcircuit arrangement in which the subset of capacitors in phase 1, namely $C_1$ and $C_2$, are connected together in series. Further, the subset is connected in series with the voltage source 22 and in series with capacitor $C_3$. The capacitor $C_3$ is charged by the voltage source 22, having a voltage $V_{in}$ and the capacitors $C_1$ and $C_2$, which each have a voltage of $V_{in}$ from phase 1. According, capacitor $C_3$ is charged to the $3V_{in}$, comprising the sum of the voltage of the voltage source 22, and the voltages across $C_1$ and $C_2$. As in phase 1, the output 23 is connected to the load but not to the remainder of the subcircuit arrangement.

Phase 3, Ph3, comprises a third subcircuit arrangement in which all of the capacitors in the set, namely C1. C2 and C3 are connected in series along with the voltage source 22. This arrangement is also connected in series with the load, via the output 23. Accordingly, capacitor $C_{out}$, which represents part of the load, has a voltage applied thereto comprising the sum of the voltages across each of the capacitors $C_1$, $C_2$ and $C_3$ and the voltage of the voltage source, which comprises $V_{in}+V_{in}+3V_{in}+V_{in}$ respectively. Thus, in use, the output 23 provides a voltage of $6V_{in}$ across the capacitor $C_{out}$ thereby achieving a conversion ratio of 6/1.

The subcircuit configurations of phase 1, phase 2 and phase 3 are also configured such that all of the capacitors in the set comprise floating or "pumping" capacitors. This has been found to provide a space and power efficient topology, particularly when combined with three phase operation. Each of the capacitors in the set has two plates and each of the plates is connected to a switch such that the capacitor can be reconfigured in the subcircuit arrangements.

Looking at capacitor C1, it is connected between a positive side of voltage source 22 and a negative side of voltage source 23 in phase one. In phase two, it is connected between the positive side of the voltage source 22 and capacitor C2. In phase three, it is again connected between the positive side of the voltage source 22 and capacitor C2. Thus, the connection at both of the plates of capacitor C1 is changed in at least one of the three phases.

Looking at capacitor C2, in phase one, it is connected between a positive side of voltage source 22 and a negative side of voltage source 23. In phase two, it is connected between capacitor C1 and capacitor C3. In phase three, it is again connected between capacitor C1 and capacitor C3. Thus, the connection at both of the plates of capacitor C2 is changed in at least one of the three phases.

Looking at capacitor C3, in phase one, it is isolated from the remainder of the subcircuit arrangement. In phase two, it is connected between the negative side of voltage source 22 and capacitor C2. In phase three, it is connected between capacitor C2 and the output 23, which, in turn, is connected to the output capacitor Cout. Thus, the connection at both of the plates of capacitor C3 is changed in at least one of the three phases.

The connections at each plate of the capacitors C1, C2 and C3 are given in the table below.

| Ca- | Capacitor Plate 1 (bottom plate) | | | Capacitor Plate 2 (top plate) | | |
| --- | --- | --- | --- | --- | --- | --- |
| pacitor | Phase 1 | Phase 2 | Phase 3 | Phase 1 | Phase 2 | Phase 3 |
| $C_1$ | Voltage source (Neg) | Voltage source (Pos) | Voltage source (Pos) | Voltage source (Pos) | Capacitor $C_2$, plate 1 | Capacitor $C_2$, plate 1 |
| $C_2$ | Voltage source (Neg) | Ca-r pacito $C_1$, plate 2 | Capacitor $C_1$, plate 2 | Voltage source (Pos) | Capacitor $C_3$, plate 2 | Capacitor $C_3$, plate1 |
| $C_3$ | — | Voltage source (Neg) | Capacitor $C_2$, plate 2 | — | Capacitor $C_2$, plate 2 | Output |

It will be appreciated that although the connections of some of the capacitors are stated in terms of the voltage source 22 and polarity to which the respective capacitor is connected, the capacitor can be considered to be connected to a corresponding terminal of the input 21 to which the voltage source 22 is connected.

This arrangement is advantageous, particularly when compared to the topology shown in FIG. 1. The two phase arrangement of FIG. 1 and the three phase arrangement of FIG. 2 both have a conversion ratio of 6/1 but the three phase topology requires one less capacitor. Further, when one or more of the capacitors is an integrated component, the topology of FIG. 2 requires less silicon area and fewer pins to connect the capacitors to the converter making it more compact. This is advantageous particularly in pin-limited or component limited applications. The number of switches required to implement the subcircuit arrangements in this embodiment is ten rather than twelve in the two-phase arrangement of FIG. 1.

A measure of the efficiency of switched capacitor dc-dc converter topologies comprises slow switching limit impedance. $R_{ssl}$, as defined in M. D. Seeman and S. R. Sanders, "Analysis and optimization of switched-capacitor dc-dc power converters", IEEE Trans. On Power Electronics, vol. 23, pp. 841-851. March 2008. $R_{ssl}$ is a function of the switching frequency and the capacitance of the floating capacitors for a given topology. The output power and efficiency of the converter are strongly dependent on $R_{ssl}$, as it represents the ability of the converter to transfer power to the output per switching cycle: the lower the $R_{ssl}$ at a certain frequency, the more energy can be transferred to the output, reducing the impact of switching losses on the efficiency.

The measure, $R_{SSL}$, is defined by $$R_{ssl} = \sum_i \sum_{j=1}^n \frac{a_{c,i}^2}{2C_i f_{sw}}$$

Where $a_{c,i}$ represents the charge transfer experienced at each of the i capacitors in the set over the j switched phases; $C_i$ represents the capacitance of the capacitor i; and $f_{sw}$ represents the switching frequency.

The design choices such as switching frequency and capacitance distribution are made to minimise $R_{ssl}$. For the 3-phase topology shown in FIG. 2, $R_{ool}$ is given by:

$$R_{ssl} = \frac{1}{f_{sw}}(3/C_1 + 3/C_2 + 1/C_3)$$

For the 2-phase topology shown in FIG. 1, it is given by:

$$R_{ssl} = \frac{1}{f_{sw}}(1/C_1 + 1/C_2 + 4/C_3 + 1/C_4).$$

In the case that all of the floating capacitors are external components, the efficiency will be high and silicon area will be low because the capacitors can be provided with higher capacitance than if they were integrated on an integrated circuit. A higher capacitance value allows for a switching frequency reduction, which reduces the amount of switching losses. In addition, the parasitic capacitance of external capacitors is almost negligible when compared to integrated capacitors. In this case, only the power switches and their drivers are integrated on the integrated circuit. If all the floating capacitors have the same capacitance $C_{ext}$, than $R_{ssl}$ of the two-phase and three phase topologies will be the same and given by:

$$R_{ssl} = \frac{1}{f_{sw}}(7/C_{ext}).$$

This shows that the 3-phase topology of FIG. 2 may achieve the same performance as the topology of FIG. 1 with one less capacitor.

Turning to the instance in which the capacitors are integrated with the power converter on an integrated circuit, the capacitors may be sized freely. The capacitance of each can be optimized to achieve a minimum $R_{ssl}$ for a given total capacitance of $C_t$. The goal here is to minimize $R_{ssl}$ for a total area spent on the capacitors. For simplicity purposes, it is assumed that the capacitance density of the capacitors is independent of the voltages across them. For the 3-phase topology, it can be determined that $R_{ssl}$ is minimized with the distribution:

$$C_1 = C_2 = \frac{\sqrt{3}}{2\sqrt{3}+1} C_t \cong \frac{2}{5} C_t, \text{ and } C_3 = \frac{1}{2\sqrt{3}+1} \cong \frac{1}{5} C_t$$

The resulting $R_{ssl}$ is given by:

$$R_{ssl} = \frac{13+4\sqrt{3}}{f_{sw}C_t} = \frac{19.928}{f_{sw}C_t} \cong \frac{20}{f_{sw}C_t}$$

For the 2-phase topology, the optimal choice can be determined to be $$C_1 = C_2 = C_4 = \frac{1}{5}C_t \text{ and } C_3 = \frac{2}{5}C_t.$$

Thus, this achieves a minimum $R_{ool}$ of, $$R_{ssl} = \frac{25}{f_{sw}C_t}$$

Thus we see that the three phase topology of FIG. 2 can attain a 20% lower $R_{ssl}$ for the same amount of total capacitance, $C_t$, compared with the two-phase topology of FIG. 1.

Figure 3:
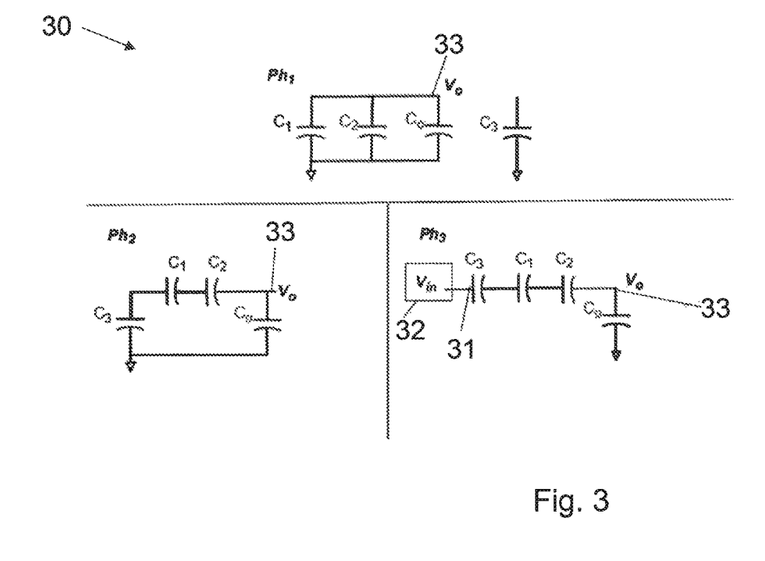
FIG. 3 shows three subcircuit arrangements of an example SCPC with a conversion ratio of 1/6 operating as a down converter.

FIG. 3 shows the SCPC of FIG. 2 operating in a down convertor mode in which the conversion ratio is 1/6. The down converter 30 has the same configuration as the up converter of FIG. 2 except the input 31 and output 33 are reversed. Thus, the subcircuit arrangements over the three phases act to provide an output voltage $V_o$ that is a sixth of the input voltage, $V_{in}$.

In phase one, $C_o$ is charged to $V_o$ by $C_1$ and $C_2$. Hence $V_1=V_2=V_o$. In phase two, $C_3$ charges the series connection of $C_1$, $C_2$ and $C_o$. Hence $V_3=V_1+V_2+V_o=3V_o$. In phase three, $C_3$ is also connected in series with $C_1$, $C_2$ and $C_o$ and charged by $V_{in}$. Hence, $V_{in}=V_3+V_1+V_2+V_o=3V_o+V_o+V_o=6V_o$. The resulting conversion ratio, $M=V_o/V_{in}=1/6$.

Figure 4:
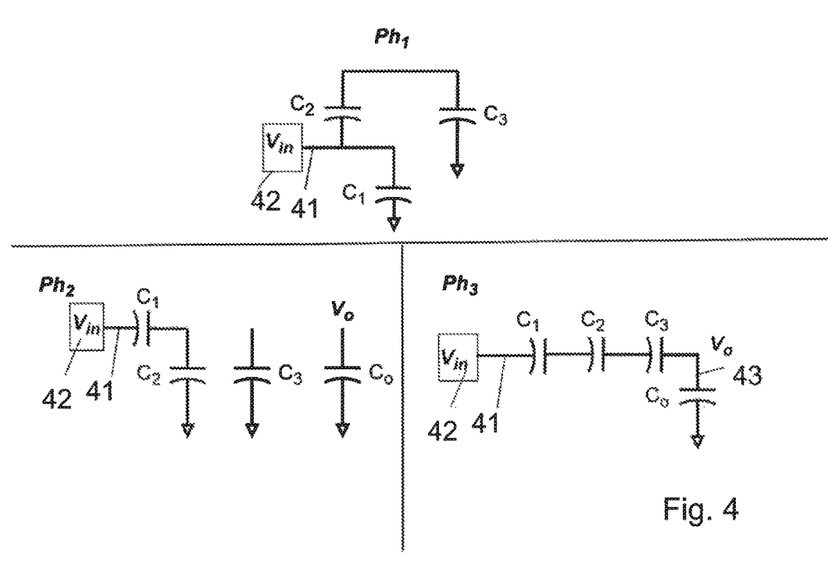
FIG. 4 shows three subcircuit arrangements of an example SCPC with a conversion ratio of 7/1 operating as an up converter.

FIG. 4 shows a further embodiment of a SCPC 40 having a conversion ratio of 7/1 that operates over three phases. In this embodiment, the SCPC 40 comprises a set of three capacitors, $C_1$, $C_2$ and $C_3$. The SCPC comprises an input 41 connected to a voltage source 42 and an output 43 connected to a load. An output capacitor Co represents the load. In all of the three phases the input 41 is connected to the voltage source 42. Thus, the voltage $V_{in}$ is applied to the set of capacitors in each of the subcircuit configurations, albeit to different capacitors in the set or different groups of capacitors in the set. In this example, in the third phase, Ph3, the set of capacitors is connected to the load via the output 43. In particular, the SCPC 40 is connected to the load only in the third phase.

Phase 1, Ph1, comprises a first subcircuit arrangement in which capacitors $C_2$ and $C_3$ are connected in series to the voltage source 42 and in a parallel arrangement with capacitor $C_1$. Capacitor $C_1$ is charged to $V_{in}$. The output 43 is not shown in the subcircuit of phase one and is connected to the load but not to the remainder of the subcircuit arrangement.

Phase 2, Ph2, comprises a second subcircuit arrangement in which capacitors $C_1$ and $C_2$, are connected together in series. Thus, $C_2$ attains a voltage of the voltage source, $V_{in}$, plus the voltage of $C_1$; $V_{in}+V_{in}=2V_{in}$. Capacitor C3 is isolated in this subcircuit arrangement. As in phase 1, the output 43 is connected to the load but not to the remainder of the subcircuit arrangement.

Phase 3, Ph3, comprises a third subcircuit arrangement in which all of the capacitors, $C_1$, $C_2$ and $C_3$ are connected in series along with the voltage source 42 and the output 43. Accordingly, capacitor Co, has a voltage applied thereto comprising the sum of the voltages across each of the capacitors $C_1$, $C_2$ and $C_3$.

Figure 5:
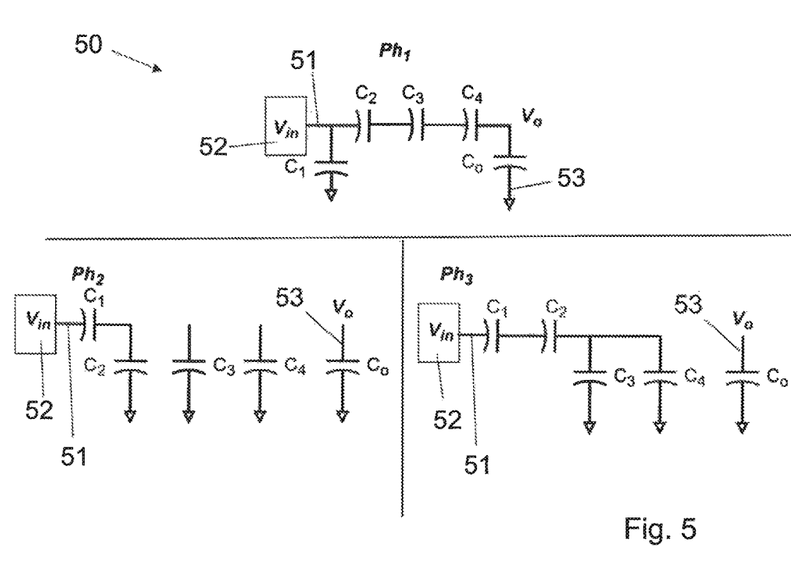
FIG. 5 shows three subcircuit arrangements of an example SCPC with a conversion ratio of 11/1 operating as an up converter.

After the initial cycle, $C_1$ has a voltage of $V_{in}$ and $C_2$ has a voltage of $2V_{in}$. Thus, when the cycle returns to phase one, $C_3$ is charged to a voltage given by the sum of the voltage of the voltage source. $V_{in}$, and the voltage across $C_2$, $2V_{in}$, which comprises $3V_{in}$. $C_1$ has a voltage of $V_{in}$. In phase two, $C_2$ is again charged to the sum of the voltage of the voltage source and the voltage of $C_1$, $V_{in}+V_{in}=2V_{in}$. $C_3$ maintains a voltage of $3V_{in}$. In phase three, the load is provided with a voltage comprising the sum of the voltage of the voltage source and the voltages across each of the capacitors $C_1$, $C_2$ and $C_3$, which comprises $V_{in}+V_{in}+2V_{in}+3V_{in}$ respectively. Thus, the output 43 provides a voltage of $7V_{in}$ to the output 43 and onto the capacitor $C_o$ thereby achieving a conversion ratio of 7/1.

voltage source 52 in series with capacitor $C_1$. In phase three, capacitors $C_3$ and $C_4$ are both charged to $4V_{in}$ by the voltage source and capacitors $C_1$ and $C_2$ arranged in series. Returning to phase one, capacitor $C_1$ will have a voltage of $V_{in}$, capacitor $C_2$ has a voltage of $2V_{in}$, capacitor $C_3$ has a voltage of $4V_{in}$ and capacitor $C_4$ has a voltage of $4V_{in}$. The voltage source 52, $C_2$, $C_3$ and $C_4$ are connected in series with the output 53. Thus, the output 53 is provided with a sum of the voltages of the voltage source, $C_2$, $C_3$ and $C_4$, which comprises $V_{in}+2V_{in}+4V_{in}+4V_{in}=11V_{in}$. Thus, the three phases comprise two charging phases and one output phase.

The following table shows the connections at each of the capacitor plates of the four capacitors over the three phases. It can be seen that all of the plates are reconfigured at least once in at least one of the three phases.

| Capacitor | Capacitor Plate 1 (bottom plate) | | | Capacitor Plate 2 (top plate) | | |
| --- | --- | --- | --- | --- | --- | --- |
| | Phase 1 | Phase 2 | Phase 3 | Phase 1 | Phase 2 | Phase 3 |
| $C_1$ | Ground | Voltage source | Voltage source | Voltage source | Capacitor $C_2$, plate 2 | Capacitor $C_2$, plate 1 |
| $C_2$ | Voltage source | Ground | Capacitor $C_1$, plate 2 | Capacitor $C_3$, plate 1 | Capacitor $C_1$, plate 2 | Capacitor $C_3$ plate1 & $C_4$ plate 1 |
| $C_3$ | Capacitor $C_2$, plate 1 | Ground | Ground | Capacitor $C_4$, plate 1 | — | Capacitor $C_2$, plate 2 |
| $C_4$ | Capacitor $C_3$, plate 2 | Ground | Ground | Output | — | Capacitor $C_2$, plate 2 |

The table below shows the connections at each of the capacitor plates over the three phases. It can be seen that all of the plates are reconfigured at least once in at least one of the three phases.

| Capacitor | Capacitor Plate 1 (bottom plate) | | | Capacitor Plate 2 (top plate) | | |
| --- | --- | --- | --- | --- | --- | --- |
| | Phase 1 | Phase 2 | Phase 3 | Phase 1 | Phase 2 | Phase 3 |
| $C_1$ | Ground | Voltage source | Voltage source | Voltage source | Capacitor $C_2$, plate 2 | Capacitor $C_2$, plate 1 |
| $C_2$ | Voltage source | Ground | Capacitor $C_1$, plate 2 | Capacitor $C_3$, plate 2 | Capacitor $C_1$, plate 2 | Capacitor $C_3$, plate1 |
| $C_3$ | Ground | Ground | Capacitor $C_2$, plate 2 | Capacitor $C_2$, plate 2 | — | Output |

It will be appreciated that the SCPC 40 can be configured to operate as a down converter in a similar manner to that shown in the SCPC 20 of FIGS. 2 and 3.

FIG. 5 shows a further embodiment of a SCPC 50 having a conversion ratio of 11/1 that operates over three phases. In this embodiment, the SCPC 50 comprises a set of four capacitors, $C_1$, $C_2$, $C_3$ and $C_4$. The capacitors are switched between three different subcircuit arrangements shown as Ph1, Ph2 and Ph3 to convert an input voltage $V_{in}$ from a voltage source 52 connected to an input 51 to an output voltage $V_{out}$ at an output 53. A load, represented by a capacitor Co, is connected to the output 53.

In this example, the output is connected to the remainder of the subcircuit arrangement in phase one. It will be appreciated that the "output phase", in which an up converted voltage is presented at output 53, may be any of the three phases as they are cyclically repeated in operation.

In phase one, Ph1, capacitor $C_1$ will be charged to $V_{in}$. In phase two, Ph2, capacitor $C_2$ will be charged to $2V_{in}$ by the It will be appreciated that the SCPC 50 can be configured to operate as a down converter in a similar manner to that shown in the SCPC 20 of FIGS. 2 and 3.

Figure 6:
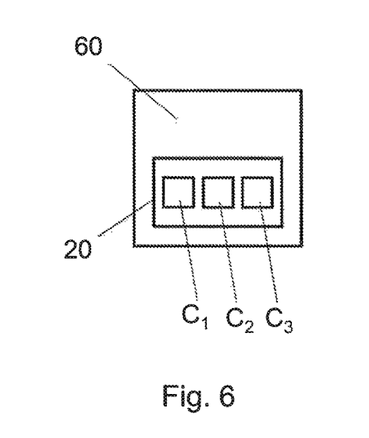
FIG. 6 shows an example SCPC formed on an integrated circuit.

FIG. 6 shows the switched capacitor power converter 20 integrated or surface mounted onto an integrated circuit chip 60. It will be appreciated that other embodiments of the SCPC may be integrated onto the chip 60. Also, other components may be present on the chip 60. In this embodiment, all of the three capacitors C1, C2 and C3 are surface mounted on the chip 60. This configuration is advantageous as it provides a space efficient arrangement.

Figure 7:
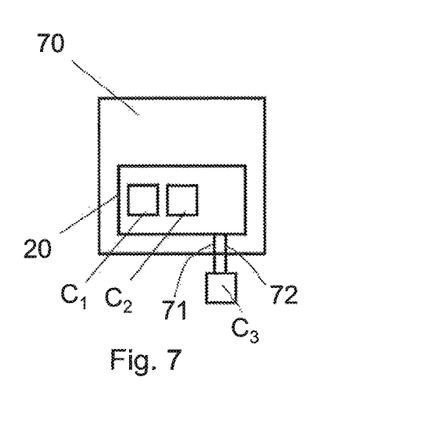
FIG. 7 shows an example SCPC partly formed on an integrated circuit and having an externally mounted capacitor.

FIG. 7 shows a variation of the arrangement shown in FIG. 6. In this embodiment, the switched capacitor power converter 20 is surface mounted on the integrated circuit chip 70. However, one of the capacitors. C3 for example, comprises a component that is external to the chip 70. Thus, the external capacitor C3 may be connected to the remainder of the SCPC 20 by pins 71, 72. It will be appreciated that one or more or all of the capacitors of the SCPC 20 or any other embodiment of the SCPC may be external components or integrated onto a chip 70. The choice of whether one or more of the capacitors is provided on the chip or not is one of the power requirement of the application, the space requirement and other factors. In any case, the three-phase scheme combined with the provision of subcircuits in which all of the capacitors are floating capacitors provides an efficient power convertor with, in general, fewer components and lower space requirement than an equivalent two phase arrangement.

Figure 8:
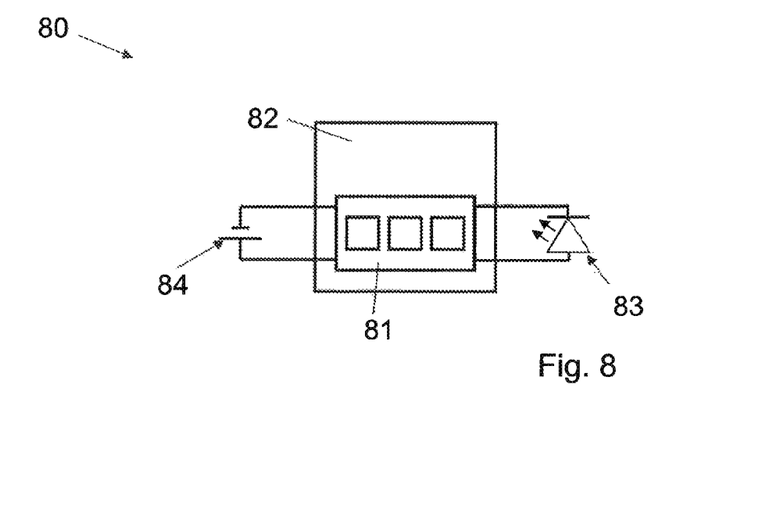
FIG. 8 shows a system for powering an organic light emitting diode.

FIG. 8 shows an organic light emitting diode (OLED) system 80. The system 80 comprises a SCPC 81 integrated into an IC chip 82. The SCPC 81 acts as a driver for an OLED 83 and up converts the voltage from a battery 83. The battery 83 comprises a lithium-ion battery that provides an input voltage of substantially 3 Volts to the input of SCPC 81. The SCPC 81 has a conversion ratio of 6/1 and thus may have the configuration of the embodiment of FIG. 2. Accordingly, the SCPC 81 is able to provide an output voltage of substantially 16 Volts (when accounting for losses) for powering the OLED. It has been found that the use of this type of power convertor, operating at a ratio of 6/1, is particularly useful for powering OLEO systems using Li-ion batteries. It will be appreciated that the integrated circuit could act as a driver for other applications and other battery types or voltage sources may be used.

Figure 9:
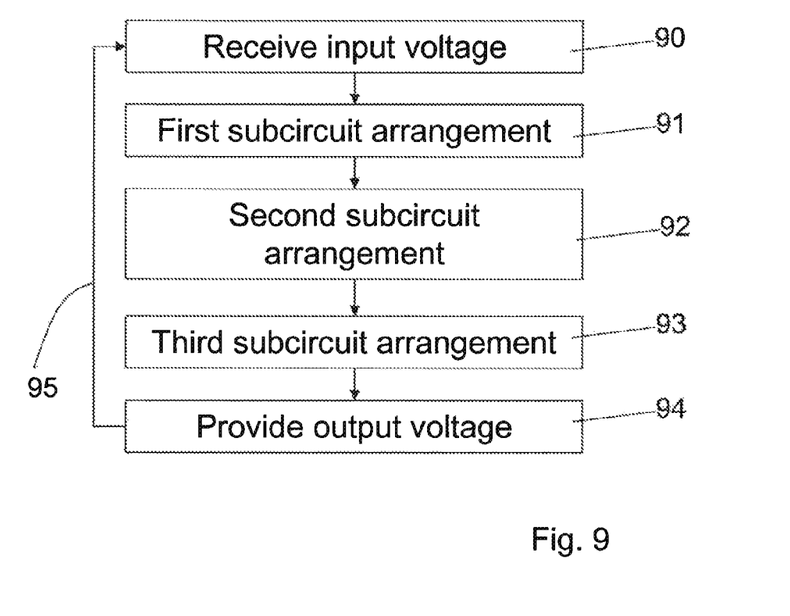
FIG. 9 shows a flow chart illustrating an example method of operation of a SCPC.

FIG. 9 shows a flow chart illustrating a method of operating a switched capacitor power converter. Step 90 illustrates receiving an input voltage at in input. Step 91 shows the controller of the SCPC controlling the switches such that a first subcircuit arrangement is adopted. In the first subcircuit arrangement, a subset of the capacitors of the SCPC may be charged. In step 92, the controller controls the switches such that a second subcircuit arrangement is adopted. The second subcircuit configuration may comprise a second charging arrangement in which at least one of the subset of capacitors is used to charge other capacitors in the SCPC. Step 93 shows the controller controlling the switches to cause the SCPC to adopt a third subcircuit arrangement 94. In this arrangement, an output voltage is provided at the output than is different to the input voltage, as illustrated by step 94. The method then returns to step 90, as shown by arrow 95, such that the controller controls the switches to cycle through the subcircuit arrangements. It will be appreciated that the input voltage may be present at the input continuously and the subcircuit arrangements may connect to the input in some or all of the various subcircuit arrangements.

The invention claimed is:

1. A switched capacitor power converter comprising
a set of at least two capacitors;
an input for receiving an input voltage
an output for outputting an output voltage different to the input voltage,
a plurality of switches configured to arrange the set of capacitors into a plurality of different subcircuit arrangements between the input and output for converting the input voltage to the output voltage;
wherein the set of capacitors is configured to adopt a first subcircuit arrangement in which the set is connected to the input, a second subcircuit arrangement different to the first subcircuit arrangement and a third subcircuit arrangement, different to the first and second arrangements, in which the set is connected to the output, the subcircuit arrangements configured such that each of the capacitors in the set acts as a floating capacitor; and
wherein the set comprises three capacitors and the subcircuit arrangements are configured such that only one of the three capacitors is charged to a voltage greater than the input voltage.

2. A switched capacitor power converter according to claim 1, in which the convertor includes a controller configured to switch the switches over three phases, the phases corresponding to the three subcircuit arrangements.

3. A switched capacitor power converter according to claim 1, in which each of the capacitors in the set comprise two capacitor plates and the set is configured such that each plate is associated with a corresponding switch.

4. A switched capacitor power converter according to claim 1, in which each of the capacitors in the set comprises two capacitor plates and wherein the controller is configured to reconfigure the connection at each of the plates in at least one of the subcircuit arrangements.

5. A switched capacitor power converter according to claim 1, in which two of the subcircuit arrangements comprise subcircuit arrangements in which the capacitors are charged and one of the subcircuit arrangements comprises an arrangement in which the output voltage is adapted to be presented to the output.

6. A switched capacitor power convertor according to claim 1, in which the set comprises three capacitors and the subcircuit arrangements are configured such to provide a 6/1 conversion ratio.

7. A switched capacitor power converter according to any preceding claim, in which the switches are provided by MOSFETs.

8. A switched capacitor power convertor according to claim 1, in which at least one of the capacitors in the set is connected to the input in each of the first, second and third subcircuit arrangements.

9. A switched capacitor power convertor according to claim 8, in which the subcircuit arrangements are arranged such that the output voltage is provided to the output only in the third subcircuit arrangement.

10. The switched capacitor power convertor according to claim 1, in which the set comprises the three capacitors, a first, second and third capacitor, and,
the first subcircuit arrangement comprises a first charging arrangement in which the first and second capacitors are arranged in a parallel arrangement and said parallel arrangement is connected to the input;
the second subcircuit arrangement comprises a second charging arrangement in which the first and second capacitors are arranged in series along with the input and are configured to charge the third capacitor; and
the third subcircuit arrangement comprises an output arrangement in which all three capacitors are arranged in series with the voltage source and the output.

11. An integrated circuit including the switched capacitor power convertor as defined in claim 1.

12. A system including the integrated circuit of the switched capacitor power convertor of claim 1, and at least one Organic Light Emitting Diode (OLED) wherein the output of the switched capacitor power convertor is configured to power said OLED.

13. A system according to claim 12, in which the input is configured to receive an input voltage from a battery.

14. A method of converting an input voltage to an output voltage in a switched capacitor power convertor having a set of at least three capacitors, comprising the steps of;
arranging the capacitors into a first subcircuit arrangement in which the set is connected to an input for receiving the input voltage,
arranging the capacitors into a second subcircuit arrangement different to the first subcircuit arrangement;
arranging the capacitors into a third subcircuit arrangement, different to the first and second arrangements, in which the set is connected to an output for outputting the converted output voltage, the subcircuit arrangements configured such that each of the capacitors in the set acts as a floating capacitor; and
configuring the subcircuit arrangements such that only one of the three capacitors is charged to a voltage greater than the input voltage.

15. A switched capacitor power converter comprising
a set of at least two capacitors;
an input for receiving an input voltage
an output for outputting an output voltage different to the input voltage,
a plurality of switches configured to arrange the set of capacitors into a plurality of different subcircuit arrangements between the input and output for converting the input voltage to the output voltage;
wherein the set of capacitors is configured to adopt a first subcircuit arrangement in which the set is connected to the input, a second subcircuit arrangement different to the first subcircuit arrangement and a third subcircuit arrangement, different to the first and second arrangements, in which the set is connected to the output, the subcircuit arrangements configured such that each of the capacitors in the set acts as a floating capacitor;
wherein at least one of the capacitors in the set is connected to the input in each of the first, second and third subcircuit arrangements; and
wherein the subcircuit arrangements are arranged such that the output voltage is provided to the output only in the third subcircuit arrangement.

* * * * *